United States Patent
Collier

(10) Patent No.: US 6,360,000 B1
(45) Date of Patent: Mar. 19, 2002

(54) METHOD AND APPARATUS FOR WATERMARK DETECTION FOR SPECIFIC SCALES AND ARBITRARY SHIFTS

(76) Inventor: David C. Collier, 1291 Hersman Dr., Gilroy, CA (US) 95020

( * ) Notice: Subject to any disclaimer, the term of this patent is extended or adjusted under 35 U.S.C. 154(b) by 0 days.

(21) Appl. No.: 09/188,990

(22) Filed: Nov. 9, 1998

(51) Int. Cl.[7] .................................................. G06K 9/00
(52) U.S. Cl. ....................................... 382/100; 382/232
(58) Field of Search ................................. 382/100, 232; 380/51, 54, 210, 252, 287; 713/176; 348/461, 463

(56) References Cited

U.S. PATENT DOCUMENTS

| | | | | |
|---|---|---|---|---|
| 5,825,892 A | * | 10/1998 | Braudaway et al. | 380/51 |
| 5,850,481 A | * | 12/1998 | Rhoads | 382/232 |
| 5,862,260 A | * | 1/1999 | Rhoads | 382/232 |
| 5,915,027 A | * | 5/1999 | Cox et al. | 380/54 |
| 5,991,426 A | * | 11/1999 | Cox et al. | 382/100 |
| 6,108,434 A | | 8/2000 | Cox | 382/100 |

* cited by examiner

Primary Examiner—Andrew W. Johns
Assistant Examiner—Abolfazl Tabatabai
(74) Attorney, Agent, or Firm—Frank Nguyen; George Almeida

(57) ABSTRACT

Methods and devices for detecting a watermark in a watermarked video stream, the watermark having been scaled by an unknown scale among a predetermined finite number of scales and shifted by an unknown number of pixels. For each of the predetermined number of scales, the video stream is divided into a plurality of equally sized scaled watermark blocks; and the plurality of scaled watermark blocks are read into a plurality of read blocks. Each of the read blocks are accumulated into one of a predetermined number of read block bins. The accumulated read blocks are then re-scaled and combined into a single video accumulated block. A predetermined quantity, such as the power of a DCT, is then evaluated within the video accumulated block. This evaluation yields information relative to presence of the watermark in the video stream, the scale applied to the watermarked video and the shift of the watermark, if any, within the watermark blocks. A fractional remainder operation is used to determine the number of read block bins for each scale under consideration as well to determine the bin into which each read block is to be accumulated.

16 Claims, 5 Drawing Sheets

METHOD AND APPARATUS FOR WATERMARK DETECTION FOR SPECIFIC SCALES AND ARBITRARY SHIFTS

BACKGROUND OF THE INVENTION

1. Field of the Invention

This invention relates generally to the field of steganography. More particularly, the present invention relates to the field of digital watermark detecting methods and devices.

2. Description of the Related Art

The synergies between recently developed data compression techniques, high capacity storage media, the internet and other high bandwidth distribution channels have rendered digital media nearly ubiquitous. In view of these developments, technologies for the control of distribution, copying and identification of authorship and/or ownership of such media are gaining importance and relevance in the marketplace. In particular, the effective enforcement of copyrights in digital media is a complex problem, primarily due to the nature of the media itself. Indeed, unless preventative measures are taken, digital data is easily and perfectly reproducible, with no loss of fidelity.

So-called "digital watermarks" have gained attention recently as one possible weapon in a content developer's arsenal to combat piracy or unauthorized distribution or reproduction of digital media, such as video. In general, watermarks are a message, symbol or any distinctive marking that is transparently added to the video signal for the purpose of identifying whether the copy is an authorized one, the author of the video content, its distributor, owner or like information. The process of adding the distinctive message, symbol or marking to the digital media is generally referred to as the embedding process. Preferably, digital watermarks are embedded in the digital media (whether audio, still pictures or video) so as to render them invisible to the intended audience (such as, for example, moviegoers) and reliably detectable by appropriate detection systems. In general, visibility and detectability are directly related to one another: the more visible a watermark is, the more reliably it will be detected. Conversely, a well-concealed watermark may be difficult to reliably detect. An acceptable compromise between visibility and detectability, therefore, must typically be reached.

Several methods have been proposed to embed a watermark in a data stream. In the case of a video stream, for example, each video frame may be divided into a lattice of blocks of a given size. Each block, therefore, consists of a matrix of picture elements (hereafter, pixels), each having a number of characteristics associated therewith, such as luminance, chrominance etc. A transformation may be carried out on each block. For example, a Discrete Cosine Transform (hereafter, DCT), a Discrete Fourier Transform (hereafter, DFT) or some other transformation may be carried out on each block of each frame of the video stream. Such transformations generate information related to the spectral content of the video stream. Once this information is obtained, a watermark or a portion thereof may be embedded in one or more blocks by evaluating and selectively modifying the transformed block of pixels and then applying the inverse transform. For example, a watermark or a portion thereof may be embedded as directed perturbations of a single or a plurality of blocks. By selectively perturbing the pixels of a transformed block and thereafter applying an inverse transform, for example, a watermark may be embedded with low visibility. This is possible, because the human visual and auditory systems do not readily distinguish between small variations in spectral content, making it possible for video information of a given frequency to mask watermark data of the same or an adjacent frequency.

Watermarked video streams often are scaled to accommodate different formats. For example, movie theater screens generally have an approximate 16:9 aspect ratio, in that the movie theater screen is about 16 units long and 9 units wide. Television screens on the other hand have a 4:3 aspect ratio. Thus, video scaled for one format must often be scaled to another format. Video may be horizontally scaled and/or vertically scaled. FIG. 1 shows an example of the scaling of a block of watermarked video data. As shown in FIG. 1, a 16 by 16 (16×16) pixel watermarked block of video data may, for example, in DVD applications, be horizontally scaled by a factor of, for example, $\frac{4}{3}$, the so-called Pan & Scan scaling. The scaled watermarked block then, has a vertical dimension of 16 pixels and a non-integral horizontal dimension of 16*$\frac{4}{3}$, or $\frac{64}{3}$.

Video is often cropped and shifted, for the same reasons as discussed above or for altogether different reasons incident to, for example, digital compression techniques and/or unauthorized manipulations of the video stream. For example, a watermark block may not start at the origin of the first video block because of, for example, one or more missing rows or columns. Such scaling, cropping and shifting render the detection of watermarks more complex. Indeed, a given video stream may have undergone some form of scaling and shifting, but the exact scale utilized and the amount of shift of the watermark block may not be known. However, the need to reliably detect the embedded watermarks remains.

What are needed, therefore, are devices and methods to detect watermarks embedded in video streams having undergone an unknown scaling among a predetermined and finite number of known scales. What are also needed are devices and methods to detect watermarks in video streams having undergone an arbitrary shift. What are also needed are devices and methods to detect watermarks in video streams having been scaled by an unknown scale factor and having been shifted by an unknown number of pixels. Also needed are devices and methods to reliably ascertain the scale and shift of a watermarked video stream.

SUMMARY OF THE INVENTION

It is, therefore, an object of the present invention to provide devices and methods to detect watermarks embedded in video streams having undergone an unknown scaling among a predetermined and finite number of known scales. Another object of the present invention is to provide devices and methods to detect watermarks in video streams having undergone an arbitrary shift. A further object of the present invention is to provide devices and methods to detect watermarks in video streams having been scaled by an unknown scale factor and having been shifted by an unknown number of pixels. In accordance with the above-described objects and those that will be mentioned and will become apparent below, an embodiment of a method of detecting a watermark in a watermarked video stream, the watermark having been scaled by an unknown scale among a predetermined finite number of scales, according to the present invention comprises, for each of the predetermined number of scales, the steps of:

dividing the video stream into a plurality of equally sized scaled watermark blocks;
   reading the plurality of scaled watermark blocks into a plurality of read blocks;

accumulating each of the plurality of read blocks into one of a predetermined number of read block bins;

re-scaling each of the accumulated read blocks and combining the re-scaled accumulated read blocks into a single video accumulated block; and evaluating a predetermined quantity within the video accumulated block.

According to further embodiments, the predetermined number of read block bins may be determined by each of the predetermined number of scales. The scaled watermark blocks may be of size $N*(I_H/J_H) \times N*(I_V/J_V)$, where an original watermark has a size of N×N and where $(I_H/J_H)$ and $(I_V/J_V)$ are the reduced fractions of the horizontal and vertical scales, respectively, and the predetermined number of read block bins may be $I_H$ for each horizontal scale and $I_V$ for each vertical scale. The reading step may read read blocks of a same size for each of the predetermined number of scales. The evaluating step may include the step of transforming the video accumulated block corresponding to each of the predetermined number of scales into a frequency domain. The transforming step may include a step of applying a DCT to the video accumulated block corresponding to each of the predetermined number of scales. The predetermined quantity may include, for example, the power of a DCT and the evaluating step may include a step of selecting that DCT having the greatest power, the DCT having the greatest power pointing to a correct scale of the watermark among the predetermined number of scales and a correct shift of the watermark within the watermark blocks.

The present invention may also be viewed as a method of processing a scaled watermarked video stream, comprising the steps of:

reading watermarked blocks from the video stream in read blocks of equal size;

cyclically distributing successive read blocks into one of a predetermined number of read bins;

accumulating the read blocks in each of the read bins;

re-scaling and combining each of the accumulated read blocks into a video accumulated block; and detecting at least a presence of a watermark in the video accumulated block.

The predetermined number of read bins may be related to the scale applied to the watermark blocks. The scale applied to the watermarked blocks may be expressed as I/J, where I and J are relatively prime and the distributing step may cyclically distribute the read blocks into I read bins. The distributing step, for each video scale of a predetermined number n of video scales of format $I_n/J_n$ where $I_n$ and $J_n$ are relatively prime, may distribute every $I_n^{th}$ read block in a same read bin among the predetermined number of read bins. The predetermined number of read bins may be $I_n$. The detecting step may include the step of applying a DFT or a DCT on the video accumulated block. The read bins may be memory spaces within a memory device and the distributing step may include a step of storing or accumulating the successive read blocks in the memory spaces. The read bins may each correspond to consistent pixel offsets of starts of read blocks relative to starts of the watermark blocks within the video stream. The detecting step may include the step of detecting a shift of the watermark within the watermark blocks. The reading, distributing, accumulating, re-scaling and combining and the detecting steps may be carried out for each suspected scale of a predetermined number of scales. A step of selecting one result of the detecting steps may also be carried out, the result pointing to a correct scale and shift of the watermark in the watermarked blocks.

According to another preferred embodiment, the present invention is a watermark detecting device to detect a watermark in a watermarked video stream, the watermark having been scaled by an unknown scale among a predetermined number of scales, comprising:

means for extracting from the video stream a plurality of equally sized scaled watermark blocks;

means for reading the plurality of scaled watermark blocks into a plurality of read blocks;

means for accumulating each of the plurality of read blocks into one of a predetermined number of read block bins;

means for re-scaling each of the accumulated read blocks and combining the re-scaled accumulated read blocks into a single video accumulated block; and means for evaluating a predetermined quantity within the video accumulated block corresponding to each of the predetermined number of scales.

A still further embodiment of the present invention is a method of processing a watermarked video stream, comprising the steps of:

utilizing a fractional remainder upon division operation to compute a number of bins in which to distribute portions of the video stream; and distributing selected portions of the video stream in selected ones of the computed number of bins.

The portions of the video stream may include watermark blocks. The utilizing step may apply the fractional remainder operation to each of a plurality of suspected scales of the watermarked video stream. The bins may include memory spaces of a memory device.

BRIEF DESCRIPTION OF THE DRAWINGS

For a further understanding of the objects and advantages of the present invention reference should be made to the following detailed description, taken in conjunction with the accompanying figures, in which.

DESCRIPTION OF THE PREFERRED EMBODIMENTS

The present invention utilizes a video accumulation procedure to allow the detection of watermarks (and subsequent deciphering of the watermark payload) in watermark-embedded video streams having undergone an unknown scaling and/or an arbitrary pixel shift. Within the context of the present invention, the term watermark includes within its definition any intentionally concealed message, symbol or other artifact that conveys some information such as, for example, indicia of ownership or authorship that is designed to be substantially invisibly hidden into the data stream. To detect watermarks within a watermark-embedded video stream requires that blocks of video data be read from the stream and individually or collectively evaluated for the presence or absence of a watermark or watermarks. However, since the scale applied to the stream is unknown, the appropriate size of the read block is also unknown. The present invention solves this problem, according to one embodiment, by reading and processing the video stream in blocks of sufficient size to accommodate watermark blocks scaled by the largest commonly used scales. This procedure may be carried out either serially or in parallel. After the watermarked video processing method according to the present invention is carried out for a variety of different scales, the watermark, if present, will stand out strongest at the correct shift and in the correct scale, the correct scale being the scale applied to the watermark in the video stream.

An infinite number of scales are theoretically possible, and the present invention is effective in detecting watermarks in a video stream scaled by any scaling factor in the horizontal and/or vertical dimensions, given sufficient time and/or processing power. In practice, however, only a limited number of scales are in common use, as only a limited number of video formats are supported. This allows the present invention to greatly reduce the number of different scales that must be evaluated to detect watermarks embedded therein in an accurate and reliable manner. It is to be understood, however, that the present invention is not limited to any particular scale dimension or to any particular number of scales currently in use.

Figure 1:
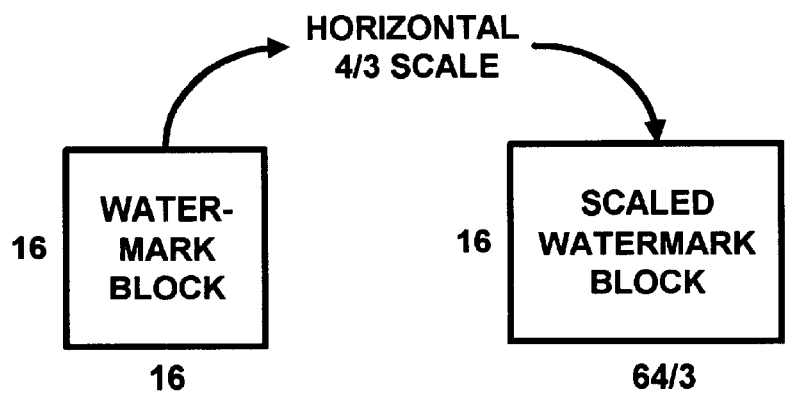
FIG. 1 is a schematic representation of scaling a 16×16 watermarked block of video pixels by a horizontal scale of ⅓, to generate a 16×6⅓ watermarked block of video pixels.
Figure 2:
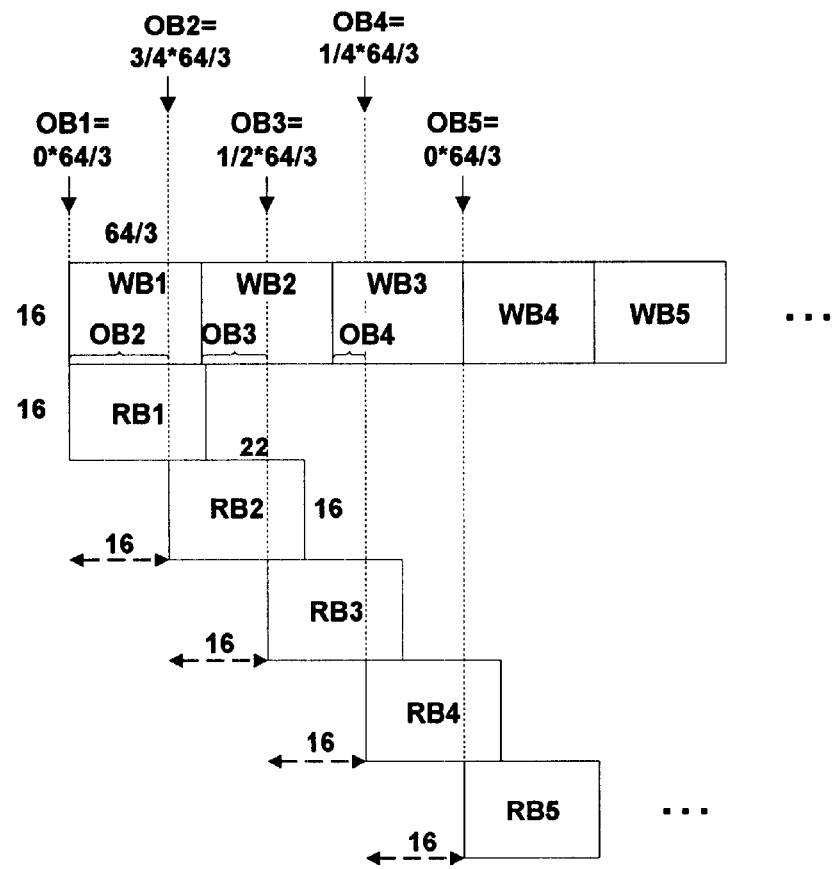
FIG. 2 is a block diagram illustrating a number of aspects of an embodiment of the method according to the present invention, using the illustrative example of a 16×16 watermark block scaled by a horizontal factor of ⅓.

FIG. 2, for illustrative purposes only, assumes that the original video embedded watermark has a block size of 16×16 pixels and that a horizontal scale of 4/3 (one of the known scales currently in use) has been applied thereto. Therefore, the original 16×16 watermarked blocks have undergone a horizontal scaling of 4/3, resulting in possibly overlapping but equally sized watermarked blocks, labeled as WB1-5, having 16 pixels in the vertical direction and 16*4/3 pixels (64/3 pixels, or about 21.3 pixels) in the horizontal dimension. Therefore, each video frame of the scaled and watermark embedded video signal is divided into a plurality of 16×64/3 blocks. To detect the watermarks within the scaled video stream, it is necessary to read the blocks, including WB1-5 and all subsequent blocks not shown in FIG. 2. However, it is not possible to read 21.3 pixels. Therefore, according to the present invention, a read block size of 16×22 pixels is chosen, as shown in read blocks RB1, RB2, RB3, RB4 and RB5. To maintain consistency with the original 16×16 watermark size, the 16×22 read blocks RB1 through RB5 (and all subsequent read blocks not shown in FIG. 2) start every 16 pixels. Hence, the read blocks RB1 through RB5 (and all subsequent read blocks not shown in FIG. 2) overlap one another. The overlapping read blocks RB1 through RB5 are shown on different lines only for clarity.

As shown in FIG. 2, the beginning of the first read block RB1 is aligned with the beginning of the first scaled watermark block WB1 and its offset OB1 relative to WB1 is zero, by inspection. The beginning of the second read block RB2 starts 16 pixels from the beginning of WB1 and is, therefore, offset relative to WB1 by a non-zero relative offset OB2. The relative offsets OB1, OB2, . . . OBn, according to the present invention, are the fractional remainders of dividing (n*16) by 64/3, where n=0, 1, 2, 3 . . . and where 64/3 is the horizontal dimension of the scaled watermark blocks WB1, WB2, WB3 . . . . Stated differently, the relative horizontal offsets OB1, OB2, . . . OBn (the offsets of the start of the read blocks relative to the start of the watermark blocks), are derived by evaluating the expression (K*N)/(N*I/J)=K/(I/J), where N=16 in this example only, where K is cyclically equal to (0, 1, 2, . . . I-1) and where "*" denotes the multiplication operation.

Thus, in the case of a 4/3 scale, as shown in FIG. 2, the relative offset OB1 is zero because the fractional remainder of dividing 0*16 by 16*4/3 is zero. The same result is obtained by evaluating the fractional remainder of the expression K/(I/J) for K=0 and I/J=4/3. The relative offset OB2 is equal to the fractional remainder of dividing 1*16 by (16*4/3) or 3/4. Thus, read block RB2 begins 16 pixels from RB1 and is offset relative to the beginning of WB1 by 3/4 of the horizontal dimension of the scaled watermark block WB1. Likewise, the relative offset OB3 is equal to the fractional remainder of dividing 2*16 by (16*4/3) or 1/2. The same result is obtained by evaluating the fractional remainder of the expression K/(I/J) where K=2 and (I/J)=4/3. Thus, RB3 begins 16 pixels from RB2 and is offset relative to the beginning of WB2 by 1/2 of the horizontal dimension of the scaled watermark block WB2. Similarly, the relative offset OB4 is equal to the fractional remainder of dividing 3*16 by (16*4/3) or 1/4. Thus, RB4 begins 16 pixels from RB3 and is offset relative to the beginning of WB3 by 1/4 of the horizontal dimension of the scaled watermark block WB3. The same result is obtained by evaluating the fractional remainder of the expression K/(I/J) where K=3 and (I/J)=4/3.

The offsets from the scaled watermark blocks, and consequently the fraction of the horizontal dimension of the scaled watermark block that these offsets represent then repeat in cyclical fashion, as follows. As is the offset of the first read block RB1, the relative offset OB5 is once again zero, as the fractional remainder of dividing 0*16 by (16*4/3) is zero. Thus, RB5 begins 16 pixels from RB4 and is aligned with the beginning of WB4. Similarly, the relative offset OB6 (not shown) can be shown to be equal to 3/4, the relative offset OB7 (not shown) can be shown to be equal to 1/2, the relative offset OB8 (not shown) can be shown to be equal to 1/4, and the relative offset OB9 (not shown) can be shown to be aligned, once again with the next watermark block, WB9 (not shown). The relative offsets OB6, RB7, RB8 and OB9 represent fractions of 3/4, 1/2, 1/4 and 0 of the horizontal dimension of the scaled watermark block, respectively. Thus, it can be seen that RB1, RB5, RB9, RB13, and every subsequent fourth read block will have an offset of zero. Similarly, it can be seen that RB2, RB6, RB10 and every subsequent fourth read block will have a ¾ offset, relative to the horizontal length of the watermark block, as shown in FIG. 2. Likewise, RB3, RB7, RB11 and every fourth subsequent read block will have a ½ offset, whereas RB4, RB8, RB12 and every fourth subsequent read block will have a ¼ offset, relative to the horizontal length of the scaled watermark blocks.

Figure 3:
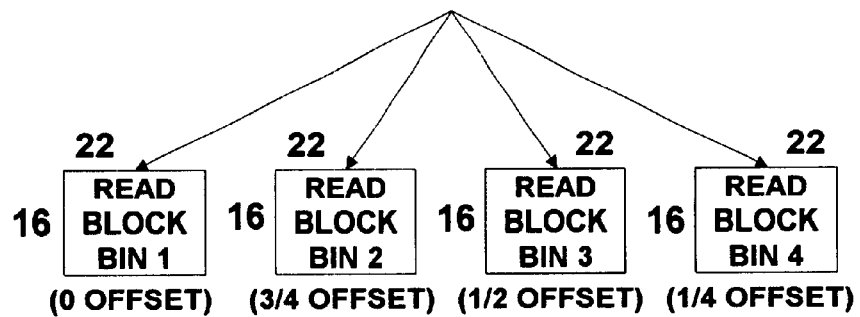
FIG. 3 is a block diagram illustrating video accumulation according to an embodiment of the present invention, using the illustrative example of a 16×16 watermark block scaled by a horizontal factor of ⅓.

Accordingly, the read blocks RB1, RB2, RB3 . . . of FIG. 2 may be classified according to a limited number of relative offset magnitudes OB1, OB2, OB3 . . . In the case of a horizontal scale of ⅘, only four different fractional remainders exist, corresponding to fractions of the horizontal length of the watermark blocks of 0, ¾, ½ and ¼, respectively. Thus, the read blocks RB1, RB2, RB3 . . . may be organized into four offset-consistent 16×22 read block bins, or memory spaces, each bin corresponding to one of the possible offsets, as shown in FIG. 3. According to the present invention, each video frame is traversed, read block by read block, each read block being added to the preceding block having the same offset in a specific read block bin corresponding to the appropriate offset. This video accumulation into specific bins corresponding to computed offsets is unaffected by any initial shift between the watermark and the first read block.

According to the example shown in FIG. 3, read blocks having an offset of zero may be accumulated in read bin 1, read blocks having an offset of ¾ relative to the horizontal dimension of the scaled watermark block may be accumulated in read bin 2, read blocks having an offset of ½ relative to the horizontal dimension of the scaled watermark block may be accumulated in read bin 3 and read blocks having an offset of ¼ relative to the horizontal dimension of the scaled watermark block may be accumulated in read bin 4. Each read bin, according to the present invention, accumulates blocks having a consistent offset. Thus, the fractional remainder operation may be used to accumulate read blocks having like offsets. In the case of a ⅘ scale, as shown in FIG. 2, the read blocks are cyclically distributed into 4 separate bins.

Each bin may correspond to a predetermined memory space of a computing device and the values corresponding to one or more selected characteristics of the pixels may be stored within the predetermined memory spaces. For example, the luminance values of the pixels of the read blocks may be chosen as the selected characteristic for accumulation in the read block bins. During the accumulation (i.e., adding) procedure, a selected pixel characteristic or characteristics of corresponding pixels of each accumulated block within each bin are added to one another. As the video signal is generally a relatively uncorrelated signal as compared to the watermark signal, the strength of the watermark will be reinforced as the read blocks accumulate, whereas the video signal itself will trend toward a mean gray level.

A filtering criteria may also be imposed at this stage of processing, to allow for selective block processing. Such selective block processing would allow the accumulation of only those read blocks having passed a given criterion. According to one such selective block processing method, the criterion utilized to detect the watermark matches the criterion employed to determine in which blocks to embed the watermark, during the watermark embedding process. Such a selective block processing method allows the visibility of the watermark to be advantageously reduced without affecting the apparent strength of the watermark signal during detection thereof. Methods and devices for such selective block processing are disclosed in co-pending and commonly assigned U.S. patent application to K. Kurowski, serial number 09/195,178, filed on Nov. 18, 1998, the disclosure of which is incorporated herewith in its entirety.

Figure 4:
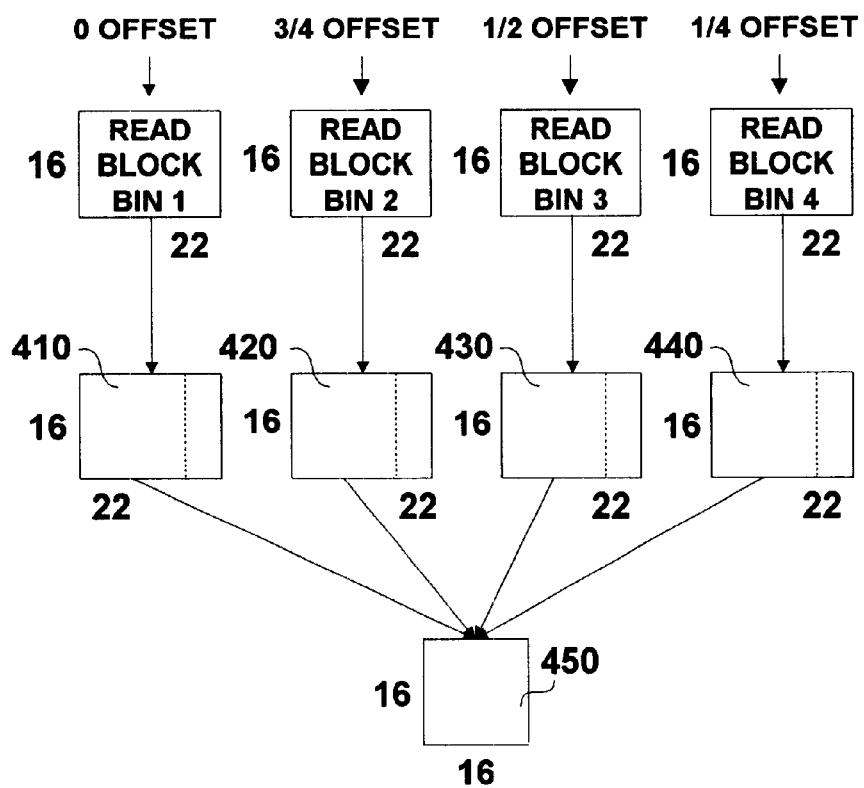
FIG. 4 is a block diagram illustrating further aspects of the present invention, including the steps of re-scaling the accumulated blocks and combining the accumulated blocks with a shift prior to detection of the watermark, using the illustrative example of a 16×16 watermark block scaled by a horizontal factor of ⅓.

When a sufficiently large number of read blocks have been accumulated in each of the read block bins, the accumulated read blocks may be re-scaled, adjusted for differential offset, combined into a single block and the scale and shift of the watermark detected. Subsequently, the structure of the detected watermark may be evaluated to e.g., decipher the hidden message thereof As shown in FIG. 4, the read blocks are now organized into four read block bins, each bin receiving and accumulating read blocks having the same offset. Each of the read blocks bins 1 through 4 are now re-scaled by ¾ (the inverse of the original ⅘ scale), to create re-scaled 16×16 pixel read blocks 410, 420, 430 and 440. Each of the 16×16 pixel re-scaled read blocks 410, 420, 430 and 440 are then combined through shifting into a single re-scaled 16×16 video accumulated block 450. Indeed, the selected characteristic or characteristics of corresponding pixels of each of the re-scaled read blocks 410, 420, 430 and 440 are added together to form a single re-scaled 16×16 video accumulated block 450.

The above-described procedure, according to the present invention is carried out, preferably in parallel, for each scale under consideration. The present invention allows for the detection of watermarks in video streams having been scaled by an unknown scale factor. What is generally known, however, is which scales are in common use for video. Those scales that are in common use constitute a finite universe of known scales. It is, therefore, not unduly burdensome to test the video stream against each of these commonly used scales in the manner described above. According to the present invention, testing the video stream against each of the commonly used scales will produce a single re-scaled video accumulated block for each of the scales under consideration. A detection algorithm may then be run on each of the re-scaled video accumulated blocks, such as the re-scaled 16×16 video accumulated block 450 of FIG. 4.

The present invention, however, is not limited to any particular type of detection algorithm. For example, the detection algorithm may transform each of the video accumulated blocks from the spatial to the frequency domain to detect the watermark and ascertain the scale and shift applied to the watermark blocks. For example, two dimensional (2-D) DCTs may be computed for each of the re-scaled 16×16 accumulated blocks 450. In this case, 256 (16*16) DCTs must be carried out for each 16×16 accumulated block 450, one for each possible offset of the watermark within the block 450. Indeed, due to possible loss of rows and/or columns due to cropping, compression algorithms and/or other digital manipulation, the watermark block may not begin at the origin of the video accumulated block 450, but may be shifted therein by an unknown number of pixels. For that reason, it is necessary to compute 256 DCTs on each of the 16×16 matrices of the blocks 450, starting each of the 256 DCTs at a different origin pixel within each of the video accumulated blocks 450. In this manner, if three scales are under consideration, three different 16×16 accumulated video blocks 450 will be obtained. For each of these video accumulated blocks 450, 256 DCTs must be carried out, for a total of 768 DCTs. Assuming that the same number of read blocks is accumulated in each of the read block bins for each scale under consideration, then the watermark will most likely manifest itself strongest in that re-scaled video accumulated block 450 having the greatest DCT power. The DCT among the 768 such DCTs having the greatest power, therefore, will simultaneously indicate which scale was used and the shift of the watermarks within the watermark blocks. Indeed, the DCT having the maximum power will be present in that video accumulated block 450 corresponding to the correct scale and at that location within that block 450 corresponding to the correct shift. This is because the video signal, when considered over time and space (a sufficient number or read blocks), is a generally wide sense stationary signal. The watermark signal, on the other hand, may be an unchanging (albeit weak) signal that is concealed in the video stream. After accumulation, therefore, the watermark signal will be reinforced whereas the uncorrelated video signal will be de-emphasized, manifesting itself as a mean gray image, for example. By identifying the re-scaled accumulated video block 450 having the DCT exhibiting the greatest power, therefore, the watermark and the correct scale and shift will have been detected.

The present invention is not limited to video accumulated blocks 450 having a size of 16 pixels by 16 pixels. Smaller or larger block sizes may be used, larger block sizes leading to more efficient coding, but increasing the computational complexity of the transform.

Figure 5:
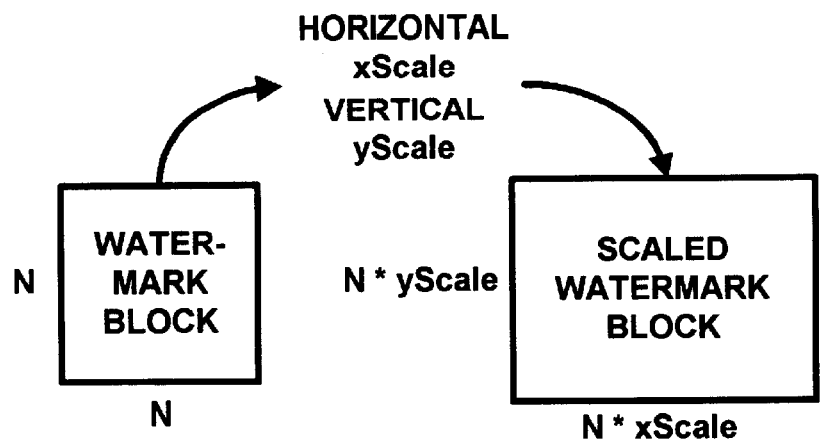
FIG. 5 is a schematic representation of scaling an N×N watermarked block of video pixels by both a horizontal scale of xScale and a vertical scale of yScale, to generate a N*xScale×N*yScale watermarked block of video pixels.

The disclosure above, for illustrative purposes, is drawn to the specific case of a 16×22 pixel read block and a watermark block having a horizontal scale of ⅔. However, the method according to the present invention may readily be generalized to watermarked blocks of any dimension, scaled to any scale and shifted within the watermark blocks by any arbitrary number of pixels. Indeed, assuming that xScale is one possible horizontal scale and that yScale is one possible vertical scale (the present invention is equally applicable to vertical and/or horizontal scales), then xScale may be represented as $I_H/J_H$ and yScale may be represented as $I_V/J_V$, where ($I_H$, $J_H$) are relatively prime numbers and where ($I_V$, $J_V$) are also relatively prime numbers. If the original size of the watermark block is assumed to be N×N pixels in size, meaning a watermark block having N pixels in the horizontal direction and N pixels in the vertical direction, then the scaled watermark blocks will have dimensions of (N*xScale)×(N*yScale) as shown in FIG. 5, which expression is equivalent to $(N*I_H/J_H) \times (N*I_V/J_V)$. For simplicity, the following description will set forth the general case wherein the watermark block is scaled only in the horizontal direction, it being understood that the present invention is readily applicable to scales in either or both of the horizontal and vertical directions.

To insure that the entire watermark block may be contained within the read block, the read block, according to the present invention, preferably has a size of N×int (N*xScale+1), where "int" is the mathematical truncating integer function. Therefore, considering only horizontal scales, the read block size or quanta may be N×int (($N*I_H/J_H$)+1). The start of each successive read block is preferably incremented by N pixels relative to the start of the previous read block. The horizontal start of the reading blocks relative to the watermark blocks, however, preferably is the fractional remainder of dividing (Shift+K*N) by (N*$I_H/J_H$). This is equivalent to the fractional remainder of ((Shift/N)*$J_H/I_H$+K*$J_H/I_H$)), where Shift denotes the beginning or origin of the watermark within a read block and where K is cyclically equal to (0, 1, 2, . . . $I_H$-1). If $J_H$ and $I_H$ are relatively prime, then the cycle length of the remainders will be exactly $I_H$, since the fractional remainder upon division of the expression ((Shift/N)*$J_H/I_H$) is equal to the fractional remainder of ((Shift/N)*$J_H/I_H$+$I_H*J_H/I_H$), since $J_H$ is an integer. Therefore, $I_H$ read block bins are sufficient to accumulate the N×int (N*$I_H/J_H$+1)-sized read blocks so that the watermark blocks accumulated in each bin will have the same offset.

The read blocks are preferably large enough to insure that the scaled watermark is fully contained therein, for any of the scales under consideration. Smaller read blocks may also be used, although the best result (most reliable detection) will be obtained when the $I_H$ read bins are sufficiently large as to accommodate an entire scaled watermark. Therefore, the maximum preferred size of the read blocks may be int (N*maxYscale+1)×N in the case wherein only vertical scales are under consideration, N×int (N*maxXscale+1) in the case wherein only horizontal scales are under consideration, or int (N*maxYscale+1)×int (N*maxXscale+1) in the case wherein both vertical and horizontal scales are under consideration, where maxXscale and maxYscale are the maximum-sized scales under consideration in the x and y directions, respectively.

Figure 6:
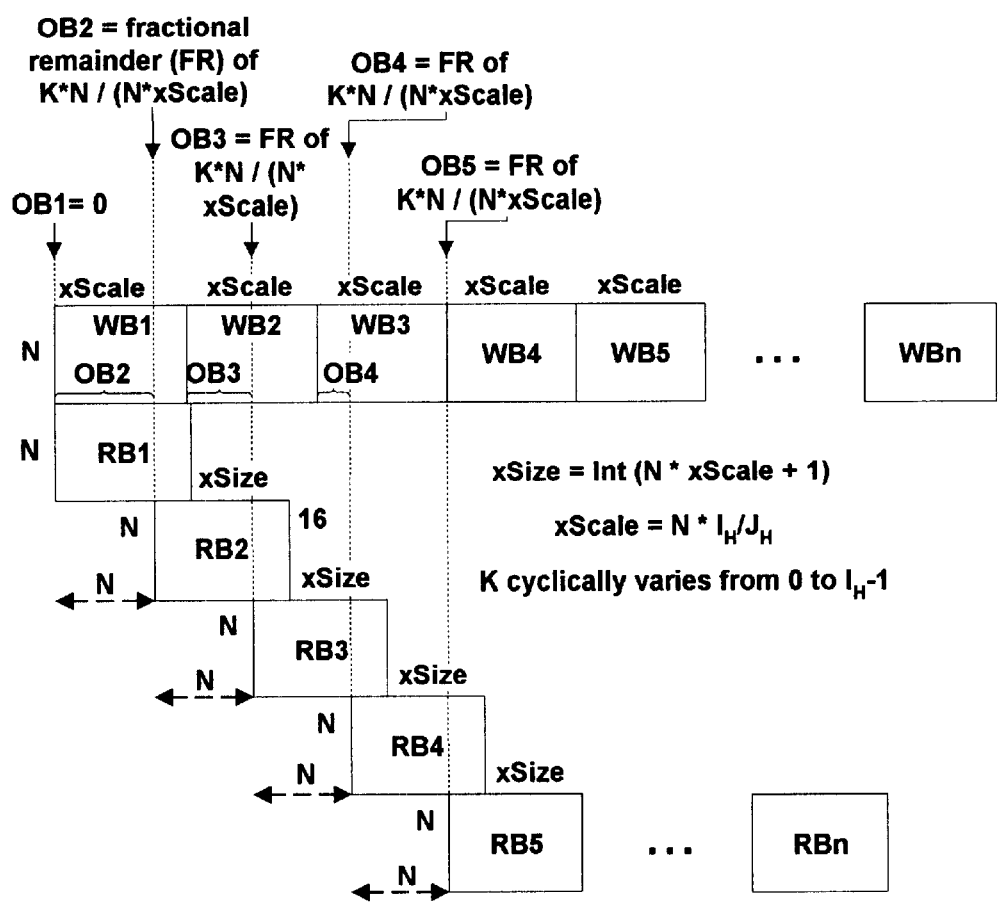
FIG. 6 is a block diagram illustrating a number of aspects of an embodiment of the method of detecting watermarks according to the present invention, using an illustrative example wherein an N×N watermark block is scaled by a horizontal factor of xScale.

As shown in FIG. 6, the video stream is divided into a plurality of n watermark blocks, labeled WB1 through WBn. The watermark blocks, in the case of a horizontal scaling, have dimensions N×N*xScale, or N×N*$I_H/J_H$. The read blocks RB1 through RBn have dimensions N×int (N*xScale+1), to insure that an entire watermark block will be read, up to the maximum-sized scaled watermarks under consideration. The read blocks RB1 through RBn are offset relative to one another by N pixels and are offset relative to their corresponding watermark blocks WB1 through WBn by the fractional remainder of the division of K*N by (N*xScale), where K is cyclically is equal to (0, 1, 2, . . . $I_H$-1). In the ⅔ horizontal case discussed relative to FIG. 2, for example, K is cyclically equal to 0, 1, 2, 3, 0, 1, 2, 3, 0 . . . Thus, as shown in FIG. 6, RB1 is aligned with WB1 and the relative offset OB1 is the fractional remainder of the division of K*N by (N*xScale), where K=0. RB2 is offset from WB1 by the fractional remainder of dividing K*N by (N*xScale), where K=1. The starts of subsequent read blocks are offset from the starts of the watermark blocks in the same manner, until K is equal to $I_H$-1, whereupon K cycles back to 0 for the next read block.

Figure 7:
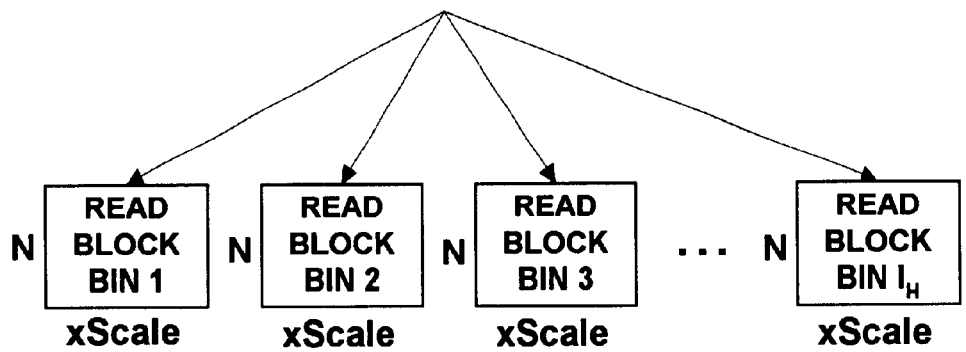
FIG. 7 is a block diagram illustrating video accumulation according to an embodiment of the present invention, using an illustrative example wherein an N×N watermark block is scaled by a horizontal factor of xScale.

Returning now to the example wherein the scale under consideration is a horizontal scale of $I_H/J_H$, the read blocks may be advantageously organized, using the fractional remainder operation described above, according to their offsets relative to the watermark blocks, there being only a finite number $I_H$ of such offsets. As shown in FIG. 7, the read blocks, therefore, may be organized into $I_H$ separate bins, each of which may be, for example, a distinct memory space of a computing device, and each corresponding to one of the $I_H$ offsets of the horizontal start of the read blocks relative to the horizontal start of the watermark blocks, continuing with the current horizontal scale example. The values corresponding to one or more selected characteristics of the pixels may be stored within the $I_H$ read block bins. For example, the luminance values of the pixels of the read blocks may be chosen as the selected characteristic for accumulation in the read block bins. During the accumulation (i.e., adding) procedure, a selected pixel characteristic or characteristics of corresponding pixels of each accumulated block within each of the $I_H$ read block bins will be added to one another. As the video signal is generally a relatively uncorrelated signal as compared to the watermark signal, the strength of the watermark will be reinforced, whereas the video signal itself will trend toward a mean gray scale.

The number of read blocks that need be accumulated in each of the $I_H$ read block bins prior to carrying out a detection algorithm will vary according to the strength of the embedded watermark signal in the video stream. It is to be noted that the strength of the watermark may be decreased by judiciously selecting the blocks in which to embed a watermark using, for example, the selected block processing method set forth in the above-cited patent application to Kurowski.

Figure 8:
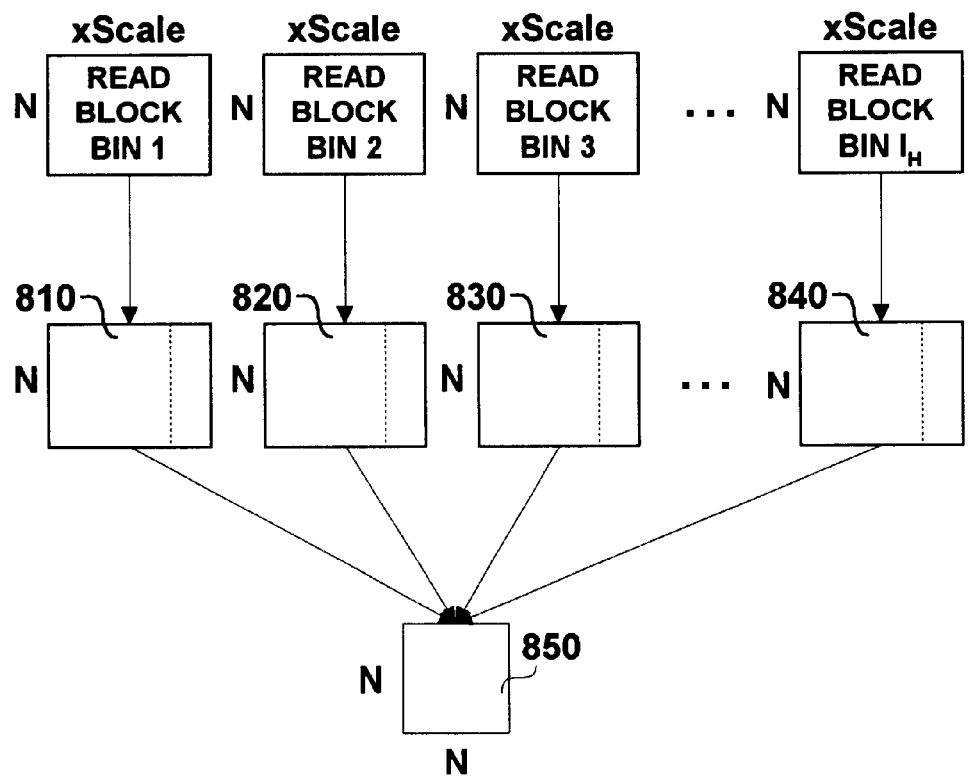
FIG. 8 is a block diagram illustrating further aspects of the present invention, including the steps of re-scaling the accumulated blocks and combining the accumulated blocks with a shift prior to detection of the watermark, using an illustrative example wherein an N×N watermark block is scaled by a horizontal factor of xScale.

As shown in FIG. 8, the read blocks are now organized into $I_H$ read block bins, each receiving read blocks having the same offset. Each of the read blocks bins are then re-scaled by $J_H/I_H$ (the inverse of the original $I_H/J_H$ scale under consideration), to create re-scaled N×N pixel read blocks 810, 820, 830 . . . 840. Each of the N×N pixel re-scaled read blocks 810, 820, 830 . . . 840 are then adjusted for offset and combined into a single re-scaled N×N video accumulated block 850 using, for example, single dimensional affine transformations. Indeed, the selected characteristic or characteristics of corresponding pixels of each of the re-scaled read blocks 810, 820, 830 . . . 840 are combined together to form a single re-scaled N×N video accumulated block 850 by linear maps utilizing a re-sampling interpolation filter, for example.

The above-described procedure, according to the present invention, is then repeated for each scale under consideration, to yield a single N×N video accumulated block 850 for each scale under consideration. The present invention allows for the detection of watermarks in video streams having been scaled by an unknown scale factor. What is generally known, however, is which scales are in common use for video. Those scales that are in common use constitute a finite universe of known scales. It is, therefore, not unduly burdensome to test the video stream against each of these commonly used scales in the manner described above. According to the present invention, therefore, testing the video stream against each of the commonly used scales will produce a single re-scaled video accumulated block 850 for each of the scales under consideration. A detection algorithm may now be run on each of the re-scaled N×N video accumulated blocks 850 of FIG. 8. The present invention, however, is not limited to any particular type of detection algorithm. For example, DCTs or DFTs may be used in the detection algorithm to detect the watermark and ascertain the scale and any shift that may have been applied to the watermark within the watermark blocks.

For example, 2-D DCTs may be computed for each of the re-scaled N×N video accumulated blocks 850. In this case, N*N separate DCTs must be carried out for each N×N accumulated block 850, one DCT for each possible offset of the watermark within the video accumulated block 850. Indeed, due to possible loss of rows and/or columns caused by cropping, compression algorithms and/or other digital manipulation, the watermark block may not begin at the origin of the video accumulated block 850, but may be shifted therein by an unknown number of pixels. For that reason, in the embodiment of the present invention wherein DCTs are used as a step of the detection mechanism, it is necessary to compute N*N DCTs on each of the N×N video accumulated blocks 850, starting each of the N*N DCTs at a different origin pixel within the N×N video accumulated block 850.

In this manner, if three scales are under consideration, three different N×N accumulated video blocks 850 will be obtained. For each of these video accumulated blocks 850, N*N DCTs may be carried out, for a total of 3*N*N DCTs. Assuming that the same number of read blocks is accumulated in each of the read block bins for each scale under consideration, then the watermark will most likely manifest itself strongest in that re-scaled video accumulated block 850 having the greatest DCT power. The DCT having the greatest power, therefore, will simultaneously point to the correct scale and to the correct shift of the watermark, if any, within the watermark blocks. Indeed, the DCT having the greatest power will be present in that video accumulated block 850 corresponding to the correct scale and at that location within that block corresponding to the correct shift. This is because the video signal, when considered over time and space (a sufficient number or read blocks), is generally a mean gray scale. The watermark signal, on the other hand, may be an unchanging (albeit weak) signal that is concealed in the video stream. After accumulation, therefore, the watermark signal will be reinforced, whereas the uncorrelated video signal will be de-emphasized, manifesting itself as a mean gray-scale, for example. By identifying the re-scaled accumulated video block 850 having the DCT exhibiting the greatest power, therefore, the watermark and the correct scale and shift will have been detected.

In some instances, there might be several re-scaled accumulated video blocks 850 having DCTs exhibiting statistically significant power levels over the mean power level of the uncorrelated video signal. Those re-scaled accumulated video blocks 850 most likely correspond to scales that are, for example, an integral multiple of the correct scale, the correct scale being that scale in fact applied to the original video stream. Even in such a case, however, the re-scaled accumulated video block exhibiting the greatest DCT power will most likely carry the watermark, if present, and will indicate the scale of the original video stream. Moreover, the origin pixel of the DCT having the greatest poser will indicate the shift imposed upon the watermark within the watermark blocks. Alternatively, if none of the scales under consideration yield a re-scaled accumulated video block 850 exhibiting a watermark signal rising significantly above the mean of the video signal, no watermark may have been embedded in the video stream and/or the video stream may have been scaled using a scale that has not yet been considered.

Figure 9:
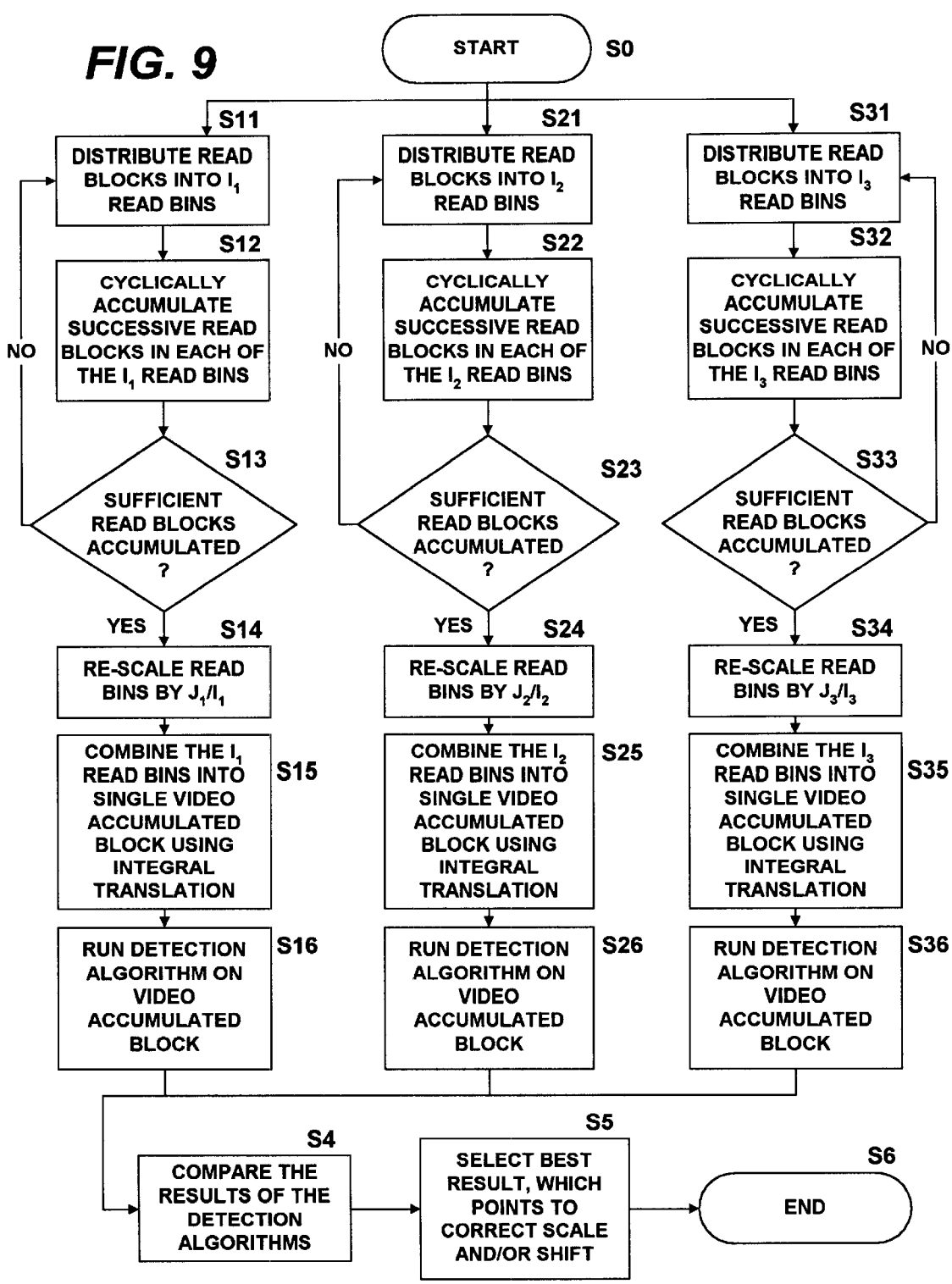
FIG. 9 is a flow chart of an embodiment of the present invention, for three known scales.

FIG. 9 shows an embodiment of the method for detecting watermarks having undergone an unknown scaling and an arbitrary shift, according to the present invention. The method begins at step S0. Thereafter, a number of steps are carried out for each scale I/J under consideration. In the illustrative example of FIG. 9, three such scales are under consideration; namely, $I_1/J_1$; $I_2/J_2$ and $I_3/J_3$. The method is extendable to any number of such scales, the only limitation being the processing power and speed of the equipment carrying out the method relative to the data rate of the video stream. Preferably, the present method is carried out in real time, meaning at a rate sufficient to keeps pace with the video stream.

Steps S11 through S16 are carried out for scale $I_1/J_1$; steps S21 through S26 are carried out for scale $I_2/J_2$ and steps S31 through S36 are carried out for scale $I_3/J_3$. In steps S11, S21 and S31, the watermark blocks are read in read blocks of equal size in the manner described above and distributed in turn into the 11, 12 and 13 read bins, respectively. In steps S12, S22 and S32, the watermark blocks in each of the respective read bins are accumulated as they are distributed therein. As this operation entails only additions of selected characteristic(s) of the constituent pixels of the read blocks, it is well suited to be carried out while keeping pace with the video stream. After it is determined, in steps S13, S23 and S33 that a sufficient number of read blocks have been accumulated in each of the read bins according to some predetermined criterion, steps S14, S24 and S34 are carried out, wherein re-scaled read blocks, such as re-scaled read blocks 810 through 840 in FIG. 8, are created by scaling the watermark blocks accumulated in the read bins by $J_1/I_1$; $J_2/I_2$ and by $J_3/I_3$, respectively. In steps S15, S25 and S35, the re-scaled read blocks are combined into a single video accumulated block such as shown at 850 in FIG. 8 using integral translation, to create one such accumulated video block for each of the three scales under consideration in the example of FIG. 9. In steps S16, S26 and S36, a detection algorithm is carried out for each of the three video accumulated blocks produced by steps S15, S25 and S35.

For example, the detection algorithm may transform the three video accumulated blocks from the spatial to the frequency domain, using, for example, a discrete Fourier or Cosine transforms. In the case of DCTs, a number of transforms may be carried out, one for each pixel in the video accumulated block. For example, if the video accumulated blocks are of size N×N, a number equal to N*N of such DCTs may be carried out. In step S4, the results of the comparisons run in steps S16, S26 and S36 are compared and the best result is selected, as shown in step S5. For example, when DCTs are carried out in steps S16, S26 and S36, the powers of all (3*N*N) 2-D DCTs are compared and that DCT having the greatest power will point to the shift, if any, of the watermark within the watermark blocks and to the scale at which the watermark was scaled within the video stream. The method ends at step S6.

While the foregoing detailed description has described preferred embodiments of the present invention, it is to be understood that the above description is illustrative only and not limiting of the disclosed invention. For example, detection methods other than those specifically described herein may be advantageously utilized without departing from the scope of the present invention. Moreover, the read blocks may have a size that is different than that described in the present application. Instead of accumulating read blocks in the respective read block bins, the read blocks may be averaged therein, for example. Other modifications will no doubt occur to those of skill in this art, and all such modifications are deemed to fall within the scope and spirit of the present invention. Thus, the present invention to be limited only by the claims as set forth below.

What is claimed is:

1. A method of detecting a watermark embedded in a video stream formed of successive images, wherein the video stream with embedded watermark is scaled by an unknown scale among a predetermined finite number of scales, comprising, for each of the predetermined finite number of scales, the steps of:
    dividing the watermarked video stream into a plurality of equally sized read blocks;
    accumulating each of the plurality of read blocks having a same offset relative to the start of the respective watermarks into a respective read block bin of a predetermined number of read block bins determined by the specific scale, so as to reinforce the strength of the watermark while de-emphasizing the video stream signal;
    re-scaling each of the accumulated read blocks having the same offset to recover the original image size;
    combining the re-scaled accumulated read block bins by shifting them and combining them into a video accumulated block; and
    evaluating a predetermined quantity within the video accumulated block for each of the predetermined finite number of scales, to detect the watermark.

2. The method of claim 1, wherein the predetermined number of read block bins is determined by each scale of the predetermined finite number of scales.

3. The method of claim 1, wherein the scaled watermark blocks are of size $N*(I_H/J_H) \times N*(I_V/J_V)$, where an original watermark has a size of N×N and where $(I_H/J_H)$ and $(I_V/J_V)$ are horizontal and vertical scales, respectively and are relatively prime integers, and wherein the predetermined finite number of read block bins is IH for each horizontal scale and IV for each vertical scale.

4. The method of claim 1, wherein the read blocks are of a same size for each of the predetermined finite number of scales, and are sufficiently large to accommodate an entire scaled watermark.

5. The method of claim 1, wherein the evaluating step includes the step of transforming the video accumulated block corresponding to each of the predetermined finite number of scales into a frequency domain by applying a DCT or DFT process to the video accumulated block for each of the predetermined finite number of scales.

6. The method of claim 5, wherein the predetermined quantity includes a power of the DCT or DFT and wherein the evaluating step includes a step of selecting that DCT or DFT having a greatest power, the DCT or DFT having the greatest power pointing to a correct scale of the watermark among the predetermined finite number of scales and a correct shift of the watermark within the watermark blocks.

7. Method of processing a scaled watermarked video stream formed of successive images, comprising the steps of:
    reading watermarked blocks from the video stream into read blocks of equal size;
    cyclically distributing successive read blocks having a same offset relative to respective watermarks into a respective read block bin of a predetermined number of read block bins, wherein the predetermined number is related to the scale applied to the watermark blocks;
    accumulating the read blocks in each of the read block bins to reinforce the strength of the watermark while de-emphasizing the video stream signal;
    re-scaling each of the accumulated read block bins to recover the original image size;
    shifting each of the re-scaled accumulated read block bins to combine them into a video accumulated block;
    detecting at least a presence of a watermark in the video accumulated block; and
    wherein the scale applied to the watermarked blocks is I/J where I and J are relatively prime and wherein the distributing step cyclically distributes the read blocks into respective I read block bins.

8. The method of claim 7, wherein the read block bins are memory spaces within a memory device and wherein the distributing step includes a step of storing the successive read blocks of a same offset in respective memory spaces, and a step of accumulating the successive read blocks of the same offset in the memory spaces.

9. The method of claim 7, wherein the read block bins each correspond to pixel offsets of starts of read blocks relative to starts of the watermark blocks within the video stream.

10. The method of claim 7, wherein the reading, distributing, accumulating, re-scaling, shifting and detecting steps are carried out for each suspected scale of the predetermined finite number of scales.

11. The method of claim 10, further comprising the step of selecting one result of the detecting steps, said one result pointing to a correct scale and shift of the watermark in the watermarked blocks.

12. Method of processing a scaled watermarked video stream formed of successive images, comprising the steps of:

reading watermarked blocks from the video stream into read blocks of equal size;

cyclically distributing successive read blocks having a same offset relative to respective watermarks into a respective read block bin of a predetermined number of read block bins, wherein the predetermined number is related to the scale applied to the watermark blocks;

accumulating the read blocks in each of the read block bins to reinforce the strength of the watermark while de-emphasizing the video stream signal;

re-scaling each of the accumulated read block bins to recover the original image size;

shifting each of the re-scaled accumulated read block bins to combine them into a video accumulated block;

detecting at least a presence of a watermark in the video accumulated block; and wherein the distributing step, for each video scale of a predetermined number n of video scales of format $I_n/J_n$ where $I_n$ and $J_n$ are relatively prime, distributes every $I_n^{th}$ read blocks in a same read block bin among the predetermined number of read block bins.

13. The method of claim 12, wherein the predetermined number of read block bins is $I_n$.

14. A watermark detecting device for detecting a watermark embedded in a video stream, wherein the video stream with embedded watermark is scaled by an unknown scale among a predetermined finite number of scales, comprising:

means for dividing the video stream into a plurality of equally sized read blocks;

means for accumulating each of the plurality of read blocks having a same offset relative to the start of the respective watermarks into a respective read block bin of a predetermined number of read block bins determined by the parameters of the specific; scale so as to reinforce the strength of the watermark while de-emphasizing the video stream signal;

means for re-scaling each of the accumulated read block bins to recover the original image size;

means for shifting the re-scaled accumulated read block bins having the same offset to combine them into a single video accumulated block; and means for evaluating a predetermined quantity within the video accumulated block corresponding to each of the predetermined finite number of scales.

15. Method of processing a watermarked data stream which is scaled by an unknown scale among a predetermined finite number of scales, comprising the steps of:

dividing the watermarked data stream into a plurality of equally sized portions each having an offset with respect to a respective watermark, said offset corresponding to a fractional remainder;

utilizing the fractional remainder to compute a number of bins in which to distribute the portions of the data stream;

accumulating selected ones of the portions of the data stream having the same offset into selected bins of the computed number of bins to reinforce the watermark while de-emphasizing the data stream effects;

re-scaling each of the distributed portions having the same offset to recover the original data signal dimensions; and combining, by a shifting process corresponding to respective offsets, each of the re-scaled distributed portions into a data accumulated block which exhibits a predetermined quantity representative of the unknown scale.

16. The method of claim 15, wherein the utilizing step applies the fractional remainder operation to each of a plurality of suspected scales of the watermarked data stream.

* * * * *